US009781626B2

(12) United States Patent
Farley et al.

(10) Patent No.: US 9,781,626 B2
(45) Date of Patent: *Oct. 3, 2017

(54) WIRELESS CHANNEL ALLOCATION IN A BASE STATION PROCESSOR

(71) Applicant: IPR LICENSING, INC., Wilmington, DE (US)

(72) Inventors: Kevin L. Farley, Wake Forest, NC (US); James A. Proctor, Jr., Indialantic, FL (US)

(73) Assignee: IPR Licensing, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/975,711

(22) Filed: Aug. 26, 2013

(65) Prior Publication Data

US 2013/0343183 A1    Dec. 26, 2013

Related U.S. Application Data

(63) Continuation of application No. 13/366,973, filed on Feb. 6, 2012, now Pat. No. 8,521,862, which is a
(Continued)

(51) Int. Cl.
*G06F 15/173* (2006.01)
*H04W 28/02* (2009.01)
(Continued)

(52) U.S. Cl.
CPC ....... *H04W 28/0247* (2013.01); *H04W 72/12* (2013.01); *H04W 72/04* (2013.01); *H04W 72/085* (2013.01); *H04W 88/08* (2013.01)

(58) Field of Classification Search
CPC . H04W 72/04; H04W 72/0446; H04W 56/00; H04W 56/001; H04W 72/048;
(Continued)

(56) References Cited

U.S. PATENT DOCUMENTS 4,136,399 A    1/1979  Chan et al.
4,287,598 A *  9/1981  Langseth ........... H04B 7/18534
                                                455/10
(Continued)

FOREIGN PATENT DOCUMENTS

JP      07-170565       7/1995
JP      08-251187       9/1996
(Continued)

OTHER PUBLICATIONS

Third Generation Partnership Project, "Technical Specification Group Radio Access Network; RRC Protocol Specification (Release 1999)," 3G TS 25.331 V3.2.0 (Mar. 2000).

(Continued)

*Primary Examiner* — Michael R Vaughan
(74) *Attorney, Agent, or Firm* — Volpe and Koenig, P.C.

(57) ABSTRACT

A system and method are provided for allocating wireless channels in a base station processor to messages sent between a subscriber and the base station processor in a wireless network. A latency period is determined corresponding to a return message to be received from a responsive node in response to an outgoing message sent from a sender via the base station processor. A latency manager in the base station processor computes the latency period and stores the latency period in an allocation table. A scheduler schedules a channel to be available at the end of the latency period indicated in the allocation table. At the end of the latency period, the return message is received and the scheduler allocates a channel as defined in the allocation table. The scheduled channel is used to transmit the message to or from the corresponding subscriber.

6 Claims, 6 Drawing Sheets

Related U.S. Application Data continuation of application No. 09/565,095, filed on May 5, 2000, now Pat. No. 8,321,542.

(51) Int. Cl.
*H04W 72/12* (2009.01)
*H04W 72/04* (2009.01)
*H04W 72/08* (2009.01)
*H04W 88/08* (2009.01)

(58) Field of Classification Search
CPC ... H04W 74/006; H04W 16/10; H04W 48/12; H04L 5/1438; H04L 12/189; H04L 1/1854
See application file for complete search history.

(56) References Cited

U.S. PATENT DOCUMENTS

| | | | |
|---|---|---|---|
| 4,675,863 A | | 6/1987 | Paneth et al. |
| 4,817,089 A | | 3/1989 | Paneth et al. |
| 4,862,453 A | | 8/1989 | West et al. |
| 4,866,709 A | | 9/1989 | West et al. |
| 5,027,348 A | | 6/1991 | Curry, Jr. |
| 5,301,053 A | * | 4/1994 | Shikada ............. H04B 10/60 398/204 |
| 5,442,625 A | | 8/1995 | Gitlin et al. |
| 5,446,735 A | | 8/1995 | Tobagi et al. |
| 5,583,793 A | * | 12/1996 | Gray et al. ............ 709/223 |
| 5,590,133 A | | 12/1996 | Billstrom et al. |
| 5,623,489 A | | 4/1997 | Cotton et al. |
| 5,684,794 A | * | 11/1997 | Lopez ............. H04W 88/08 370/337 |
| 5,687,194 A | | 11/1997 | Paneth et al. |
| 5,697,059 A | | 12/1997 | Carney |
| 5,796,730 A | | 8/1998 | Bellec |
| 5,815,816 A | | 9/1998 | Isumi |
| 5,818,845 A | | 10/1998 | Moura et al. |
| 5,841,768 A | | 11/1998 | Ozluturk et al. |
| 5,917,812 A | * | 6/1999 | Antonio ............. H04B 15/02 370/337 |
| 5,953,346 A | | 9/1999 | Luddy |
| 6,023,459 A | | 2/2000 | Clark et al. |
| 6,038,223 A | * | 3/2000 | Hansson ............ H04W 74/002 370/328 |
| 6,047,189 A | * | 4/2000 | Yun et al. ............ 455/452.2 |
| 6,075,792 A | | 6/2000 | Ozluturk |
| 6,101,383 A | | 8/2000 | Poon |
| 6,122,483 A | | 9/2000 | Lo et al. |
| 6,178,329 B1 | | 1/2001 | Chao et al. |
| 6,219,343 B1 | | 4/2001 | Honkasalo et al. |
| 6,222,832 B1 | | 4/2001 | Proctor |
| 6,226,521 B1 | | 5/2001 | Liu et al. |
| 6,295,285 B1 | * | 9/2001 | Whitehead ............ 370/329 |
| 6,317,595 B1 | * | 11/2001 | St. John ............. H04W 76/04 370/329 |
| 6,377,548 B1 | * | 4/2002 | Chuah ............ H04L 12/2602 370/233 |
| 6,381,462 B1 | * | 4/2002 | Charas ............ H04B 7/0408 455/452.2 |
| 6,388,999 B1 | | 5/2002 | Gorusch et al. |
| 6,393,014 B1 | * | 5/2002 | Daly et al. ............ 370/352 |
| 6,407,986 B1 | * | 6/2002 | Dutta ............ H04B 7/18513 370/280 |
| 6,466,963 B1 | | 10/2002 | Shigemori |
| 6,475,090 B2 | | 11/2002 | Roelofs |
| 6,487,406 B1 | * | 11/2002 | Chang et al. ............ 455/422.1 |
| 6,490,256 B1 | | 12/2002 | Jones et al. |
| 6,496,490 B1 | | 12/2002 | Andrews et al. |
| 6,603,747 B2 | | 8/2003 | Asai |
| 6,622,251 B1 | * | 9/2003 | Lindskog et al. ............ 713/300 |
| 6,650,869 B2 | | 11/2003 | Kelly et al. |
| 6,657,987 B1 | | 12/2003 | Kumar et al. |
| 6,694,141 B1 | | 2/2004 | Pulkkinen et al. |
| 6,707,808 B1 | * | 3/2004 | Vedrine ............ 370/337 |
| 6,721,303 B1 | * | 4/2004 | Menzel ............ H04W 72/0446 370/337 |
| 6,731,939 B1 | | 5/2004 | Watanabe et al. |
| 6,751,193 B1 | | 6/2004 | Kudrimoti |
| 6,760,311 B1 | * | 7/2004 | Raith ............ H04B 1/036 370/252 |
| 6,901,057 B2 | | 5/2005 | Rune et al. |
| 6,937,579 B2 | | 8/2005 | Bantz et al. |
| 6,954,470 B2 | * | 10/2005 | Paneth et al. ............ 370/478 |
| 6,963,547 B1 | | 11/2005 | Kwak et al. |
| 6,965,778 B1 | | 11/2005 | Ferguson et al. |
| 6,975,613 B1 | | 12/2005 | Johansson |
| 6,987,741 B2 | | 1/2006 | Kelly et al. |
| 6,999,440 B2 | * | 2/2006 | Abe ............ H04B 7/2681 370/335 |
| 7,006,476 B1 | | 2/2006 | Tateishi |
| 7,127,655 B2 | | 10/2006 | Chandhok et al. |
| 7,298,713 B2 | | 11/2007 | Goldberg et al. |
| 7,336,967 B2 | | 2/2008 | Kelly et al. |
| 7,480,324 B2 | | 1/2009 | Aiello et al. |
| 7,486,637 B2 | | 2/2009 | Goldberg |
| RE40,715 E | * | 5/2009 | Izumi ............ H04B 7/2643 370/294 |
| 7,702,339 B2 | | 4/2010 | Moon et al. |
| 7,839,836 B2 | | 11/2010 | Stephens et al. |
| 7,917,624 B2 | | 3/2011 | Gidwani |
| 7,969,979 B2 | | 6/2011 | Fuchs et al. |
| 7,991,964 B2 | | 8/2011 | Tsien |
| 8,107,394 B2 | | 1/2012 | Kim et al. |
| 8,155,655 B1 | | 4/2012 | Vargantwar et al. |
| 8,180,388 B1 | | 5/2012 | Ghaus et al. |
| 2001/0041573 A1 | | 11/2001 | Ishii et al. |
| 2001/0055293 A1 | * | 12/2001 | Parsa et al. ............ 370/342 |
| 2002/0057709 A1 | | 5/2002 | Edmon et al. |
| 2002/0155808 A1 | | 10/2002 | Kawamura |
| 2003/0067895 A1 | * | 4/2003 | Paneth et al. ............ 370/330 |
| 2003/0099220 A1 | | 5/2003 | Jeon |
| 2003/0142646 A1 | * | 7/2003 | Paneth et al. ............ 370/330 |
| 2003/0146871 A1 | | 8/2003 | Karr et al. |
| 2007/0073805 A1 | * | 3/2007 | Jorgensen ............ H04L 1/20 709/203 |
| 2011/0306375 A1 | | 12/2011 | Chandra et al. |
| 2012/0089681 A1 | | 4/2012 | Chowdhury et al. |
| 2012/0134343 A1 | | 5/2012 | Farley et al. |

FOREIGN PATENT DOCUMENTS

| | | |
|---|---|---|
| JP | 9215050 A2 | 8/1997 |
| JP | 2000-078187 A2 | 8/1998 |
| JP | 11-234286 | 8/1999 |
| JP | 11-331123 | 11/1999 |
| WO | 98/37706 | 8/1998 |
| WO | 99/44341 | 9/1999 |

OTHER PUBLICATIONS

Third Generation Partnership Project, "Technical Specification Group Radio Access Network; Physical layer procedures (FDD) (Release 1999)", 3G TS 25.214 V3.2.0 (Mar. 2000).

Third Generation Partnership Project, "Technical Specification Group Radio Access Network; MAC protocol specification (Release 1999)," 3G TS 25.321 V3.3.0 (Mar. 2000).

Third Generation PartnershipProject, "Technical Specification Group Services and System Aspects; QoS Concept and Architecture (Release 1999)," 3G TS 23.107 V3.2.0 (Mar. 2000).

Allman et al., "TCP Congestion Control," Network Working Group, Request for Comments: 2581, (Apr. 1999).

Jacobson et al., "TCP Extensions for High Performance," Network Working Group, Request for Comments: 1323, (May 1992).

* cited by examiner

SUBSCRIBER PROFILE TABLE

| Subsriber | Window Size | Window | Average Message Size | Outstanding Acks | Messages Received | Max Outstanding Acks |
|---|---|---|---|---|---|---|
|  |  |  |  |  |  |  |
|  |  |  |  |  |  |  |
|  |  |  |  |  |  |  |
|  |  |  |  |  |  |  |
|  |  |  |  |  |  |  |

WIRELESS CHANNEL ALLOCATION IN A BASE STATION PROCESSOR

CROSS REFERENCE TO RELATED APPLICATIONS

This application is a continuation of U.S. patent application Ser. No. 13/366,973, filed Feb. 6, 2012, which issued as U.S. Pat. No. 8,521,862 on Aug. 27, 2013, which is a continuation of U.S. patent application Ser. No. 09/565,095, filed May 5, 2000, which issued as U.S. Pat. No. 8,321,542 on Nov. 27, 2012, the contents of which are hereby incorporated by reference herein.

BACKGROUND OF THE INVENTION

Wireless network infrastructure equipment is increasingly being used to allow computing devices to communicate over a wireless medium to a wired network such as the Internet. In a wireless data network, a plurality of local computing devices, such as PCs, are supported via wireless subscriber access units. A subscriber access unit provides a wireless radio link to a base station processor. The base station processor is also connected to an Internet gateway that provides a connection to a wired network. Similar to a cellular telephone network, the base station processor allocates a plurality of wireless channels on a demand basis for providing message transmission to and from the subscriber units. The wireless channels are allocated to messages sent and received from the subscriber unit on behalf of the local computing device.

In a typical base station processor, the wireless channels are a scarce resource which are shared by the subscriber units. Messages are often queued pending availability of a channel. Further, wired networks typically employ techniques to detect the speed with which a recipient is processing messages. These techniques reduce congestion by avoiding overburdening a recipient through reducing the rate at which messages are sent, and consequentially reducing throughput. Such techniques can interpret the queuing of messages at the base station processor as congestion in the wired network, and accordingly, reduce throughput. In particular, the protocols employed in the wired network do not lend themselves well to efficient communication over wireless connections.

In a TCP/IP network, for example, congestion control techniques such as slow start, congestion avoidance, fast retransmit, and fast recovery are employed. In accordance with the slow start technique, as defined in Internet RFC 2581, an acknowledgement message (ack) is expected as a return message to each message sent. The number of bytes, or messages, sent is gradually increased as the acks are received in a timely manner. If the ack is not received in a timely manner, additional messages will be sent less frequently, reducing throughput. The queuing of messages at the base station processor, however, is not indicative of congestion at the base station processor. Rather, the queuing is indicative of the propagation delay inherent in wireless networks. This propagation delay is interpreted, however, as congestion by the wired line protocols such as TCP/IP.

It would be beneficial therefore, to provide a method and apparatus which can anticipated the arrival of the return message, and schedule a channel to be available to transmit the message via the base station processor so that throughput in the wireless network is not reduced by the wired network protocol congestion control features such as slow start.

SUMMARY OF THE INVENTION

A system and method are provided for allocating wireless channels in a wireless communication system to support the transmission of messages between a subscriber and a base station processor. A latency period is determined corresponding to the timing of a return message expected from a responsive node in response to an outgoing message sent from a sender via the base station processor. A latency manager in the base station processor computes the latency period and stores the latency period in an allocation table. A scheduler schedules a channel to be available at the end of the latency period indicated in the allocation table. At approximately the end of the latency period, the return message is received and the scheduler allocates a channel as defined in the allocation table. The scheduled channel is used to transmit the return message to or from the corresponding subscriber.

The latency manager computes the latency period using a variety of transmission parameters defined in the wired line network protocol. For example, in a TCP/IP network, the transmission parameters used to compute the latency period can include window size, space available in the window, average message size, number of outstanding acks, message type, number of messages received in the session, number of outstanding acks, maximum number of outstanding acks, and other transmission parameters.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3a shows message transmission in the system of FIG. 2;

FIG. 3b shows a channel allocation table corresponding to the messages of FIG. 3a;

FIG. 5a shows a web page fetch using the system of FIG. 1;

FIG. 5b shows the allocation table corresponding to the messages of FIG. 5a;

DETAILED DESCRIPTION OF THE INVENTION

Figure 1:
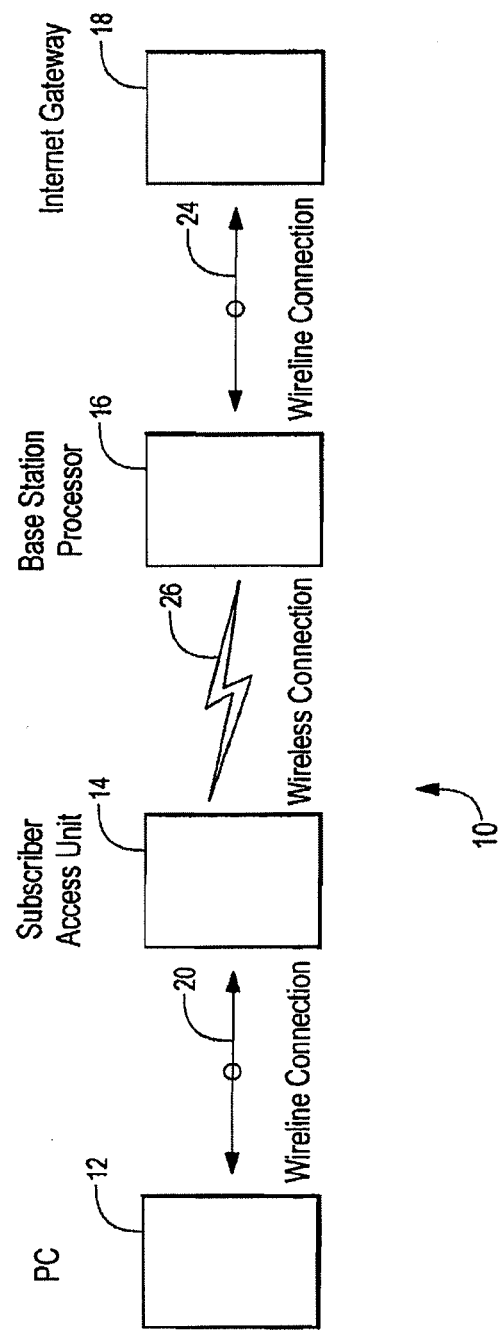
FIG. 1 is a block diagram of a communications system suitable for performing wireless channel allocation as defined herein.

FIG. 1 is a block diagram of a communication system 10 operable for channel allocation in a wireless network as defined herein. The communication system includes a local computing device such as a PC 12, a subscriber access unit 14, a base station processor 16, and an Internet gateway 18. The PC 12 is in communication with the subscriber 14 via a wired connection 20. The subscriber 14 is in communication with a base station processor 16 via a wireless connection 26. The base station processor is in communication with a Internet gateway 18 via wired link 24. The Internet gateway 18 is adapted for communication via a public access network such as the Internet.

The PC 12 may therefore be provided access to the network server 18, which may be any remote entity located on the Internet or other network, through a combination of the wired 20, 24 and wireless connection 26 provided. The wired connection 20, 24 is typically supported by a protocol such as TCP/IP or UDP. The wireless connection is supported by protocols such as the protocol described in pending U.S. patent application entitled "Dynamic Frame Size Settings for Multichannel Transmission," published as PCT application No. WO 99/44341, Sep. 2, 1999. Typically, the PC 12 provides an Internet Protocol (IP) packet to the subscriber 14 over the wired connection 20, which may for example be an Ethernet type connection. The subscriber 14 removes the framing of the IP packet and transfers the data in the IP packet to the base station processor 16 over the wireless connection 26 in accordance with a wireless link protocol. The base station processor 16 extracts the wireless connection frames and forwards them, in IP packet form, over the wireline connection 24 to the Internet gateway 18. The subscriber 14 and the base station processor 16 are therefore considered as "endpoints" of the wireless connection 20.

Figure 2:
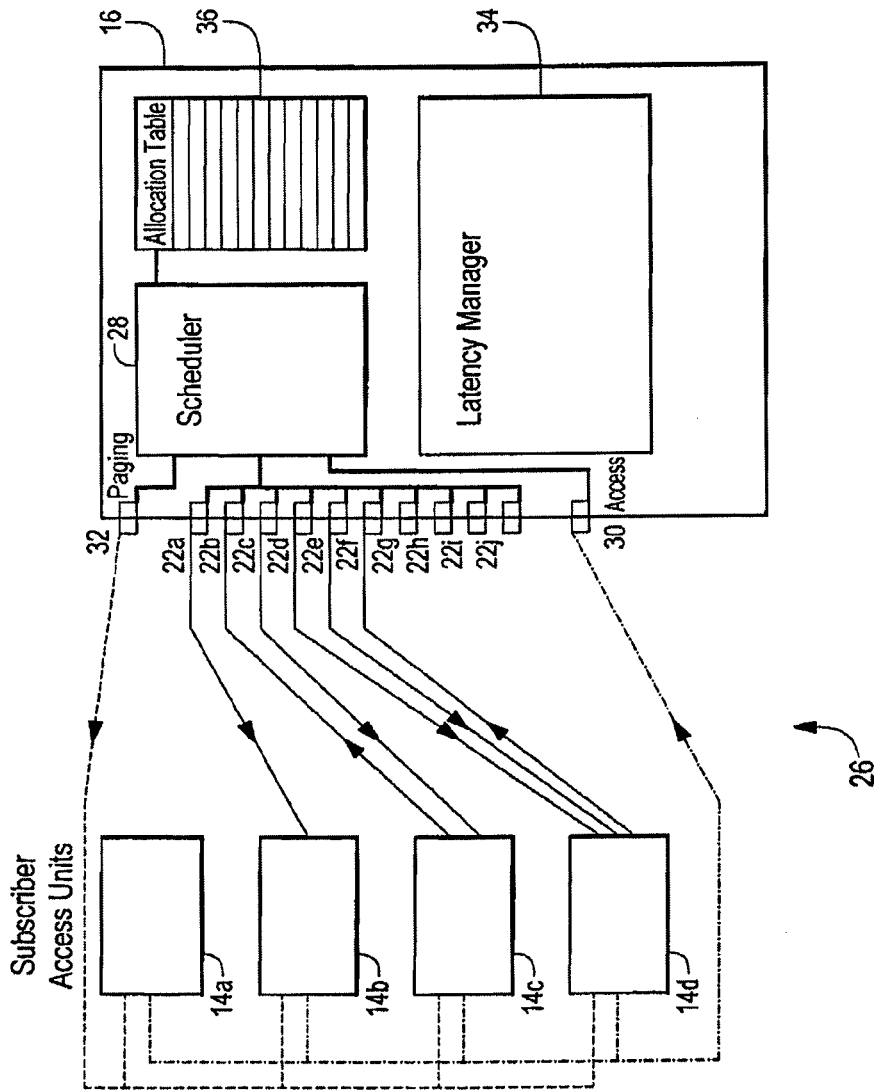
FIG. 2 shows a base station processor in communication with a plurality of subscriber access units.

Referring to FIG. 2, the base station processor 16 is shown in more detail. The base station processor 16 is in communication with a plurality of subscribers 14a-14d. Additional subscriber units 14(x) can be provided. The subscribers communicate with the base station processor via wireless channels 22a-22j shown. Additional channels 22(x) can be added. As indicated above, the channels 22 are used to transmit messages to and from the subscribers 14. A scheduler 28 allocates the channels 22 on a demand basis, and assigns available channels to messages transmitted between the subscribers 14 and the base station processor 16.

The channels 22 are unidirectional between the subscribers 14 and the switch 16, however multiple channels may be allocated to messages originating from or destined to a particular subscriber 14. In the example shown, channel 22a is allocated to transmit a message from the base station processor 16 to the subscriber 14b. Channel 22b is allocated to receive a message at the base station processor 16 from the subscriber 14c, while channel 22c is allocated to send a message to the subscriber 14c. Channels 22d and 22e are allocated to transmit a message to the subscriber 14d, and channel 22f is allocated to receive a message from the subscriber 14d. Typically, as indicated above, the scheduler 28 is rapidly allocating channels to the subscribers to accommodate channel requests for messages to be sent to and received from the subscribers 14.

Two dedicated channels, common to all subscribers 14, are employed to initiate message traffic on a channel. A common access channel 30 is used by a subscriber 14 to request a channel from the base station processor 16. A common paging channel 32 is used to notify a subscriber 14 that it is being allocated a channel. The messages are then forwarded by the subscribers 14 to the PC 12 or to the base station processor 16, depending on direction.

The base station processor 16 also includes a latency manager 34, for determining latency delays, and an allocation table, 36 both described further below. In a typical message transmission, as indicated above, a number of latency delays occur between the message sender and the receiver, or responsive node. For example, a wireless propagation delay occurs in transmitting a message from the base station processor 16 to the subscriber 14 (FIG. 1). A network propagation delay occurs as a message is transmitted over the Internet or other public access network. Other latency delays are present as will be described further below. It is common in a protocol such as TCP/IP to expect a return message, typically an ack, in response to a message sent to a responsive node. In accordance with the invention as defined herein, the latency manager is included in the base station processor to compute the latency delay and schedule a channel accordingly.

Figure 3:
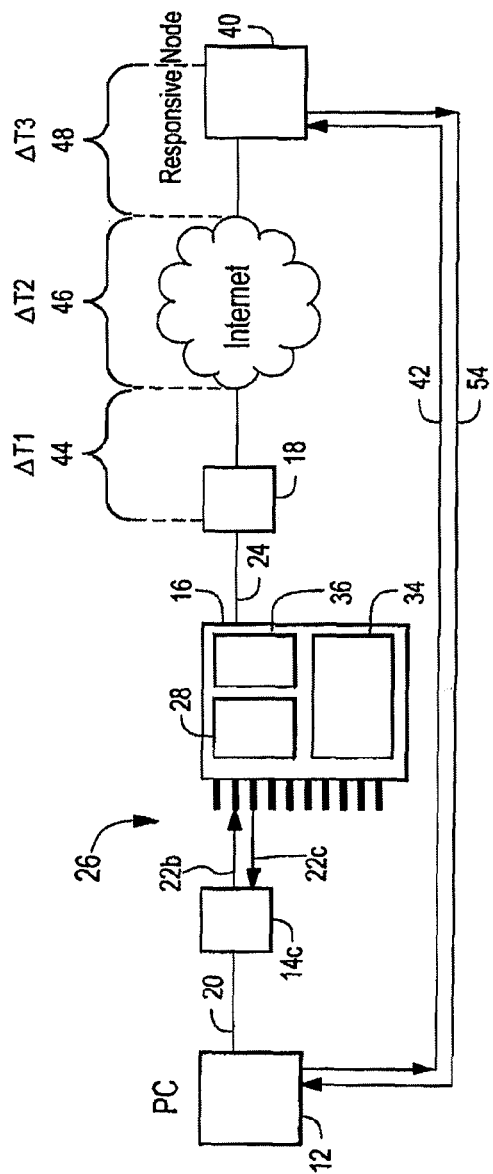

Referring to FIGS. 3a and 3b, there is shown a more detailed design of the base station processor 16, including the latency manager 34, allocation table 36, and scheduler 28. The latency manager 34 is a process that computes the latency delay associated with the return message sent by a responsive node 40. The allocation table 36 is a memory structure that stores an entry 38a, 38b for each channel allocation 22b, 22c, and associated latency times $T_0$ and $T_0+T_L$. A scheduler 28 is a process that reads the allocation table 36 and latency information to determine allocation of channels to expected messages.

In a typical message transmission, the PC 12 sends a connection request message to a responsive node 40, as indicated by arrow 42. The message 42 is sent at time $T_0$. Accordingly, an entry 38a is written in the allocation table 36 to allocated channel 22b with subscriber 14c at time $T_0$. As the message 42 is received through channel 22b, the latency manager 34 examines the message. The latency manager 34 determines that the type of the message is a TCP/IP connection request, and that therefore that an ack can be expected as the return message.

The latency manager 34 determines the latency period that will elapse before receipt of the return message at the base station processor 16. For example, the latency manager 34 determines that an ISP (Internet Service Provider) delay 44 will occur between the Internet gateway 18 and the Internet 50, as indicated by $_\Delta T1$; In addition, a network propagation delay 46 will occur as the message 42 is transmitted over the Internet 50 as indicated by $_\Delta T_2$; and then a responsive node delay 48 will occur as the responsive node 40 processes the messages and sends the return message, as indicated by $_\Delta T_3$. The latency period $T_L$ 52 is therefore computed by the latency manager to be $T_L = _\Delta T_1 + _\Delta T_2 + _\Delta T_3$. The latency manager then writes entry 38b into the allocation table 36 to indicate that following the latency period, a return message 54 can be expected from responsive node 40 to the subscriber 14c. Accordingly, channel 22c is allocated at time $T_0+T_L$ for subscriber 14c. The return message 54 is sent by the responsive node 40, and received by the base station processor 16 at time $T_0+T_L$. In accordance with the allocation table 36, the scheduler 28 allocates channel 22c to transmit the return message 54 to the subscriber 14c.

In alternate embodiments, the channels are scheduled as a general pool in the allocation table 36 and are not allocated to a specific subscriber until the return message is actually received.

In the example above, the latency manager 34 computes the latency period $T_L$ 52 based on the type of the message and the corresponding return message expected. Many protocols, including the TCP/IP protocol, specify not only the return message, but other transmission parameters as well. The manner of determining the latency delay therefore depends upon a number of factors depending upon the protocol in use. In a TCP/IP protocol, such factors may include transmission parameters such as window size, space available in the window, average message size, number of outstanding acks, message type, number of messages received in the session, number of outstanding acks, maximum number of outstanding acks, and other transmission parameters. For example, TCP/IP employs a sliding window performance enhancing feature, as defined in Internet RFC 1323. Such features may be employed in conjunction with the transmission parameters to improve performance through a base station processor as defined herein.

A TCP/IP network may operate in accordance with the sliding window protocol in an effort to provide reliable stream delivery while maximizing bandwidth. Under this protocol, both endpoints of a TCP/IP connection negotiate an acceptable window size. The window size designates a maximum number of bytes which may be transmitted by a sending unit before receiving an acknowledgment from the receiving unit. Generally, the window is referred to in terms of maximum number of unacknowledged packets. Once the sending unit receives an acknowledgment for the first packet in the window, it "slides" the window along and sends the next packet.

In the message 42 sent in the example of FIG. 3a, the latency manager examines the TCP/IP packet in a non-destructive manner to determine the type of the message. Other aspects of the TCP/IP packet, enumerated above, could also be examined to obtain transmission parameters, and employ these parameters in determining the latency period 52 associated with the return message. In the examples following in FIGS. 4 and 5a-5c, the latency manager 34 further includes a subscriber profile table 56 for storing transmission parameters corresponding to each of the subscribers 14.

Figure 4:
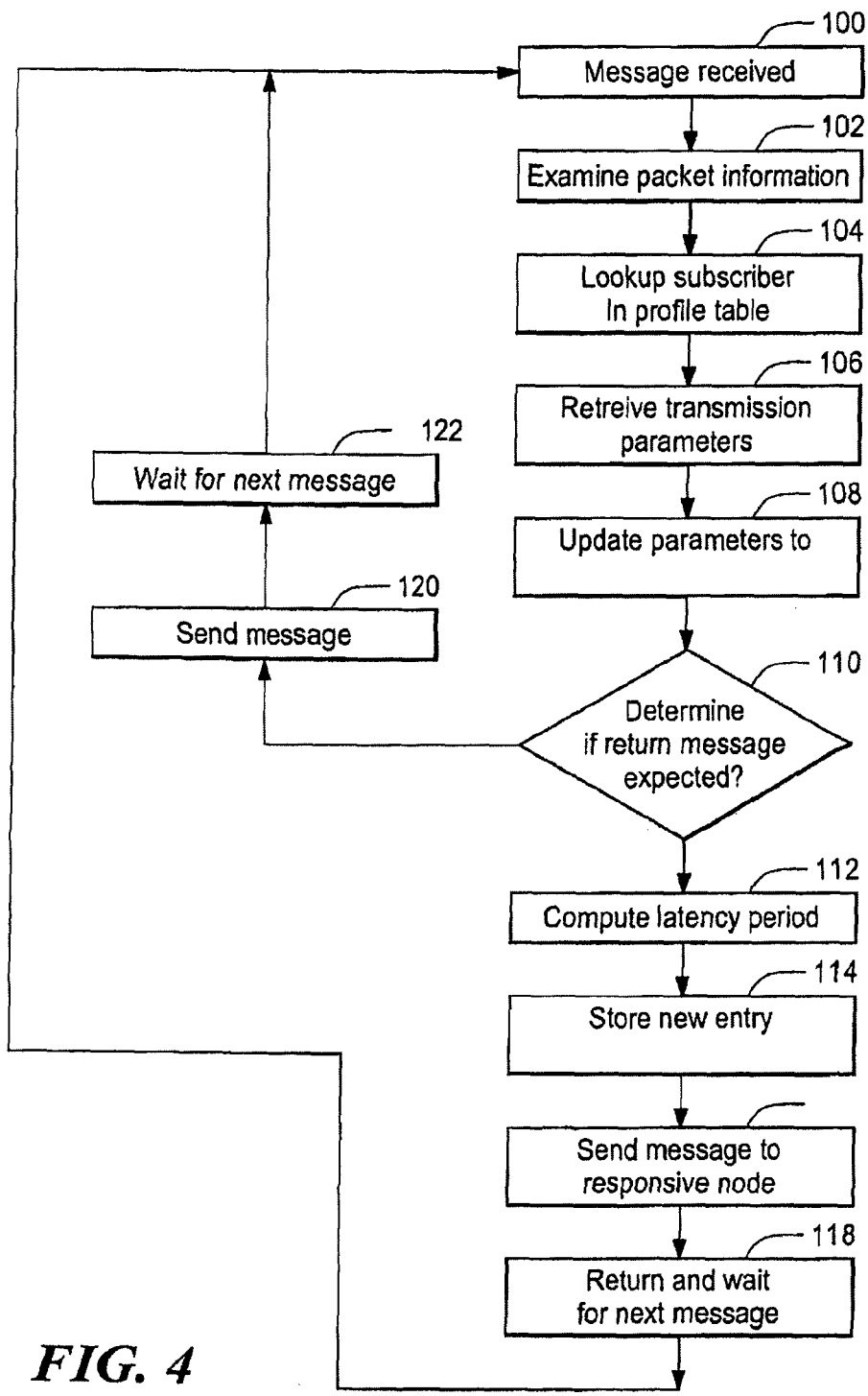
FIG. 4 shows a flowchart of channel allocation as defined herein.

Referring to the flowchart depicted in FIG. 4 together with the system diagram of FIG. 3a, a message is received at the base station processor 16, as shown in step 100. The latency manager 34 examines the TCP/IP packet information, as described at step 102. A lookup is performed in the subscriber profile table to find the entry corresponding to the subscriber, as depicted at step 104. The corresponding transmission parameters are retrieved, as shown at step 106. The transmission parameters are updated to reflect the TCP/IP packet information examined at step 102, as described at step 108. A determination is made to indicate whether a return message is expected to complement the message, as depicted at step 110. If no return message is expected, the message is sent, as shown at step 120, and control reverts to step 100 until the next message is received, as described at step 122. If a return message is expected, the latency manager 34 computes the latency period 52 using the transmission parameters of the subscriber updated in step 108, as depicted at step 112. A new entry corresponding to the computed latency period 52 is stored in the allocation table 36, as shown at step 114. The message is then sent to the responsive node 40, as depicted in step 116. Control reverts to step 118 until the next message is received.

Figures 5A, 5B:
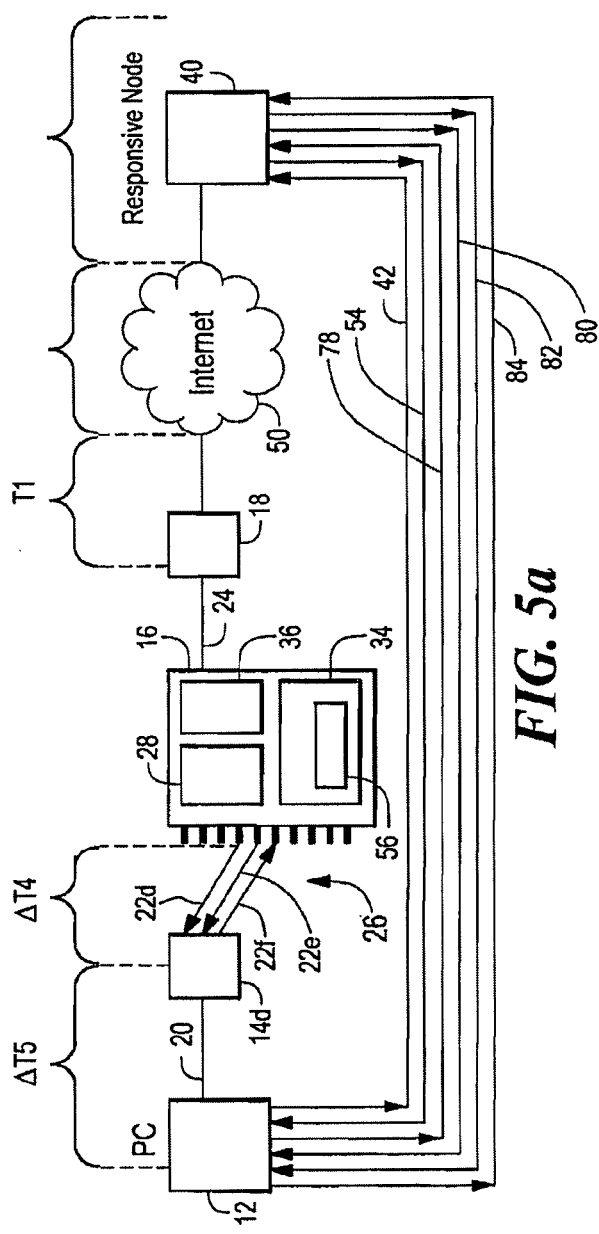
Figures 5C, 6:
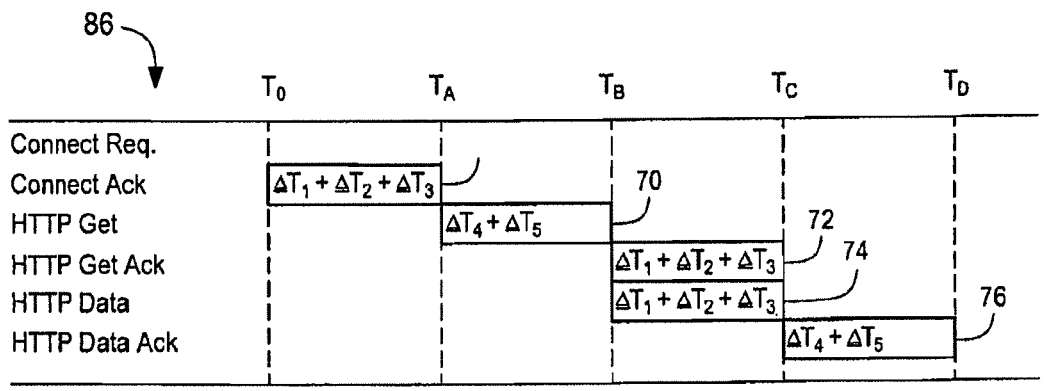
FIG. 5c shows a timing chart corresponding to the allocation table of FIG. 5b.
FIG. 6 shows a subscriber profile table for channel allocation as defined herein.

In FIGS. 5a-5c, another embodiment of the message transmission sequence of FIG. 3b is shown in more detail. A connection request 42 is sent by the PC 12 at time $T_0$. The latency manager 34 examines the packet information and determines the subscriber 14d. The latency manager looks up the transmission parameters of subscriber 14d in the subscriber profile table 56, and updates the parameters accordingly to correspond to the new packet information. The latency manager 34 determines that a connection acknowledgment message 54 is expected as the return message. The latency manager 34 computes the latency delays $_\Delta T_1$, $_\Delta T_2$, and $_\Delta T_3$, as a result of the updated transmission parameters, and computes the latency period $T_A$ as the result $T_A =\, _\Delta T_1 +\, _\Delta T_2 +\, _\Delta T_3$. The latency manager 34 stores entry 58 in the allocation table 36 to inform the scheduler to allocate channel 22d for subscriber 14d at time $T_A$, as indicated by timing chart 86 entry 68.

The responsive node 40 then sends the return message 54. The base station processor 16 receives the return message 54, and the latency manager 34 examines the packet information. The latency manager looks up the transmission parameters of subscriber 14d in the subscriber profile table 56, and updates the entry accordingly. The latency manager 34 determines that the type of the return message is a connection response acknowledgment, and that a request message is likely to be sent from the PC as a return message.

As the message is sent to the subscriber 14d, the latency period is computed as follows. The wireless propagation time $_\Delta T_4$ is indicative of the latency associated with transmission over the wireless connection 26 between the base station processor 16 and the subscriber 14d. The subscriber response time $_\Delta T_5$ is indicative of the latency associated with transmission over the wired line 20 between the subscriber 14d and the PC 12. Accordingly, the latency manager 34 uses the subscriber profile table to compute the latency period $_\Delta T_5$ from $_\Delta T_4 +\, _\Delta T_5$. A corresponding entry 60 is written in the allocation table 36 to inform the scheduler to allocate channel 22f for subscriber 14d at time $T_B$, as indicated by timing chart 86 entry 70.

The PC 12 sends an HTTP get message 78 after receiving the ack 54. The corresponding transmission parameters are looked up in the subscriber profile table 56, and updated accordingly to correspond to the message 78. As a result of the updated transmission parameters, the latency manager 34 determines that an HTTP get ack 80 and an HTTP data message 82 are likely to be sent as return messages at the same time. Accordingly, the latency manager computes the latency period $T_c$ from $T_c =\, _\Delta T_1$, $_\Delta T_2 +\, _\Delta T_3$, and writes two entries to the allocation table 36. Entry 62 allocates channel 22d, and entry 64 allocates channel 22e, for subscriber 14d at time $T_c$, as indicated by timing chart 86 entries 72 and 74.

As the HTTP data message is received at the switch 16, the latency manager 34 determines that an HTTP data ack 84 is the return message, and writes entry 66 to allocate channel 22f at $T_D =\, _\Delta T_4 +\, _\Delta T_5$, as shown by timing chart 86 entry 76.

An example of the subscriber profile table 56 is shown in FIG. 6. Each entry 86 is adapted to store transmission parameters 88 corresponding to the messages received by a particular subscriber 14. Such parameters include window size, space available in the window, average message size, number of outstanding acks, message type, number of messages received in the session, number of outstanding acks, and maximum number of outstanding acks. Other parameters can be specified as defined in the TCP/IP protocol or other protocol as employed by the base station processor.

Those skilled in the art should readily appreciate that the programs defining the operations and methods defined herein are deliverable to the base station processor in many forms, including but not limited to a) information permanently stored on non-writeable storage media such as ROM devices, b) information alterable stored on writeable storage media such as floppy disks, magnetic tapes, CDs, RAM devices, and other magnetic and optical media, or c) information conveyed to a computer through communication media, for example using baseband signaling or broadband signaling techniques, as in an electronic networks such as the Internet or telephone modem lines. The operations and methods may be implemented in a software executable out of a memory by a processor. Alternatively, the operations and methods may be embodied in whole or in part using hardware components, such as Application Specific Integrated Circuits (ASICs), state machines, controllers or other hardware components or devices, or a combination of hardware and software components.

While this invention has been particularly shown and described with references to preferred embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method for use in a subscriber unit, the method comprising:
   receiving first information from a wireless communications base station, wherein the first information indicates a first set of time periods for the subscriber unit to wait to monitor a downlink channel to receive resource allocations from the wireless communications base station;
   receiving second information from the wireless communications base station, wherein the second information indicates a second set of time periods for the subscriber unit to wait to monitor the downlink channel to receive resource allocations from the wireless communications base station;
   monitoring the downlink channel to receive a resource allocation from the wireless communications base station after expiration of each time period of the first set of time periods; and
   on a condition that a resource allocation is not received after expiration of each time period of the first set of time periods, monitoring the downlink channel to receive a resource allocation from the wireless communications base station after expiration of each time period of the second set of time periods.

2. The method of claim 1, wherein the wireless communications base station is a cellular base station.

3. The method of claim 1, wherein the resource allocation is for reception of internet protocol (IP) data.

4. A subscriber unit, the subscriber unit comprising:
   a receiver;
   an integrated circuit;
   the receiver and integrated circuit configured to receive and process first information from a wireless communications base station, wherein the first information indicates a first set of time periods for the subscriber unit to wait to monitor a downlink channel to receive resource allocations from the wireless communications base station;
   the receiver and integrated circuit further configured to receive and process second information from the wireless communications base station, wherein the second information indicates a second set of time periods for the subscriber unit to wait to monitor the downlink channel to receive resource allocations from the wireless communications base station;
   the receiver further configured to monitor the downlink channel to receive a resource allocation from the wireless communications base station after expiration of each time period of the first set time periods; and
   on a condition that a resource allocation is not received after expiration of each time period of the first set of time periods, the receiver further configured to monitor the downlink channel to receive a resource allocation from the wireless communications base station after expiration of each time period of the second set of time periods.

5. The subscriber unit of claim 4, wherein the wireless communications base station is a cellular base station.

6. The subscriber unit of claim 4, wherein the resource allocation is for reception of internet protocol (IP) data.

* * * * *